Nov. 27, 1928.

C. H. HENDERSON 1,693,202

COMBINED BUMPER BAR AND CARRIER FOR MOTOR VEHICLES

Filed Dec. 3, 1927

Inventor
Cecil Havelock Henderson
By D. Singer, Atty.

Patented Nov. 27, 1928.

1,693,202

UNITED STATES PATENT OFFICE.

CECIL HAVELOCK HENDERSON, OF NORTH MELBOURNE, VICTORIA, AUSTRALIA.

COMBINED BUMPER BAR AND CARRIER FOR MOTOR VEHICLES.

Application filed December 3, 1927, Serial No. 237,528, and in Australia December 10, 1926.

This invention consists of an improved type of rear bumper that is convertible for use also as a luggage carrier when desired.

Briefly stated the bumper consists of a vertical rack of bars supported by brackets from the chassis, said rack being capable of being swung into horizontal position to support luggage.

In order to provide a carrier of sufficient width an extension leaf or rack of bars is hinged to the bumper and swung into horizontal position and so supported when required and preferably the bumper is capable of being slid rearwardly of the car to provide room for the extension rack.

The invention in preferred form is illustrated by the accompanying drawings whereof, Fig. 1 is an elevation drawn to a reduced scale of the rear bumper.

Figure 1:

The bumper consists of a series of bars 1 preferably of channel section arranged in the form of a vertical rack said bars being joined near the ends by a back plate 2 each provided about the center with a lug 3 pivotally connected by a clamping bolt 4 to a bracket B rearwardly extending from the chassis 5.

When the bumper is to be slid outwardly each bracket B is constructed for extension and consists of a rearwardly projecting arm 6 bolted to the chassis 5 fitted between a pair of extension bars 7 to which the lug 3 is pivoted by bolt 4.

Figure 4:
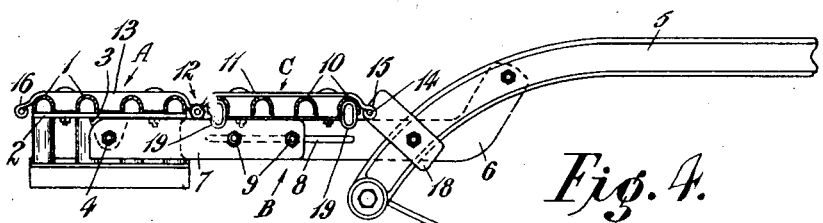
Figure 4 is a section on line IV—IV of Figure 3.
Figure 3:
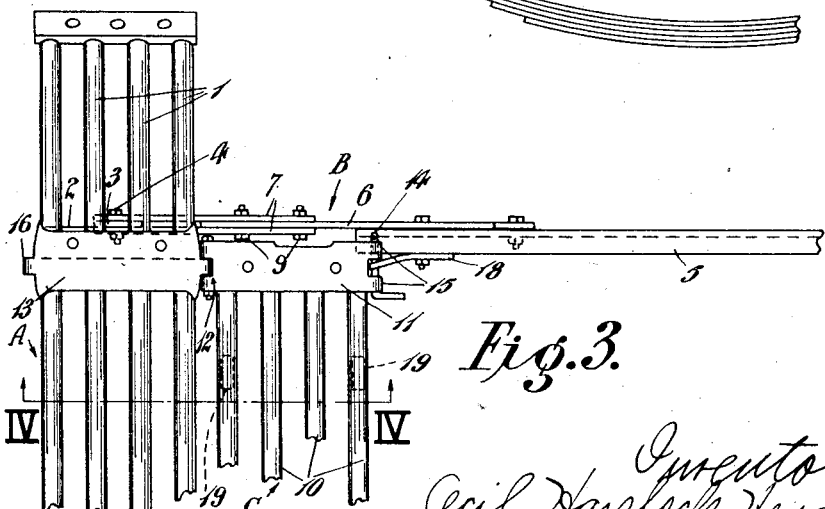
Figure 3 is a plan (broken) illustrating the device used as a carrier as well as a bumper.

Each arm is formed with a longitudinal slot 8 through which pass bolts 9 also fitted to the bar 7. By unloosening the bolts 9 the bars 7 and consequently the bumper A may be slid rearwardly of the car as illustrated in Figures 3 and 4 to extend the bracket and provide more space between the back of the car and the bumper for convenience in packing luggage.

Figure 2:
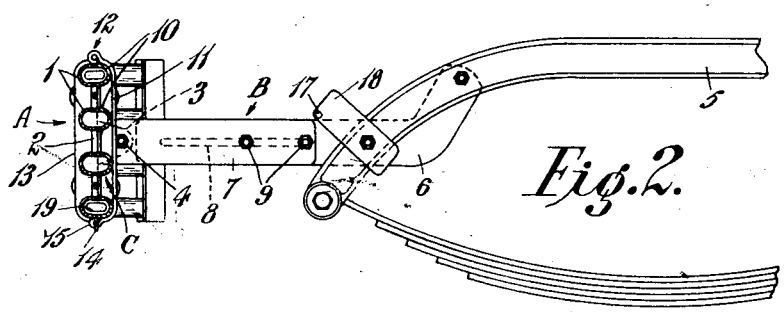
Figure 2 is an enlarged section on line II—II of Figure 1.

The bumper A is held in ordinary vertical position as in Figures 1 and 2 by tightening the nuts on the clamping bolts 4 and when it is desired to make use of the bumper as a luggage carrier the nuts of the clamping bolts 4 are unloosened and the bumper swung into horizontal position so as to rest on the bracket B and the nuts again tightened.

According to the preferred form as illustrated for providing a wider carrier an extension rack C is provided and located between the brackets B.

Said extension rack C preferably consists of the same number and the same shaped bars 10 arranged at a distance apart corresponding to the bars 1 of the bumper A and when of channel section their concave sides are facing each other.

The bars 10 are connected together to form a rack by end plates 11 which are connected by hinges 12 at their upper ends to corresponding front plates 13 joining the bars 1 of the bumper A.

When the bumper is in vertical position as in Figures 1 and 2 the bars 10 of the extension rack C lie at the back of the corresponding bars 1 of the bumper A and the extension rack C is retained in position by means of readily detachable pins 14 each passed through eyes 15 on the lower end of the end plates 11 of the extension rack and an eye 16 on the bottom of the front plate 13 of the bumper.

When the bumper A is supported in horizontal position to act as a carrier as in Figures 3 and 4, the extension rack C is unfastened and also swung on its hinges 12 into horizontal position and secured by the pins 14 which engage holes 17 in bent lugs 18 bolted on the chassis.

When the bars 1 of the bumper and extension rack are made of channel or approximately semi-circular cross sectional shape a few short lengths of metal tubes 19 may be fitted in some of the channels of the bars of one rack and said tubes by engaging the bars of the other rack maintain a good fit between said bumper A and extension rack C which minimizes rattling.

It will be understood that even when the bumper is turned horizontally for use as a carrier it still acts as a bumper for the protection of the car.

Furthermore if the brackets B are long enough to provide a luggage carrier of suitable width they may merely consist of rigid non-extensible arms as 6 and the width of the bumper rack may vary as desired.

I claim:—

1. A combined rear bumper and carrier for motor cars consisting of a vertical bumper rack pivoted to the end of extensible brackets projecting from the chassis and adapted to be swung into horizontal position with means for fixing said rack in both positions.

2. A combined rear bumper and carrier for motor cars in which the bumper comprises a series of bars joined by plates to form a vertical rack and said plates are provided with lugs pivoted upon clamping bolts to the outer ends of brackets projecting rearwardly from the car.

3. A combined rear bumper and carrier for motor cars in which the bumper comprises a series of bars joined by plates to form a vertical rack and said plates are provided with lugs pivoted upon clamping bolts to the outer ends of brackets projecting rearwardly from the car, each bracket constituting an arm rearwardly extending from the chassis and formed with an elongated slot through which pass bolts fixed to a pair of extension bars to which said lugs are pivoted.

4. A combined rear bumper and carrier for motor cars consisting of a vertical bumper rack comprising a number of bars and pivoted on brackets projecting rearwardly from the chassis and an extension rack hinged to said bumper rack with means for fixing said extension rack in vertical position adjacent said bumper rack and both racks in horizontal positions when utilized also as a luggage carrier.

5. A combined rear bumper and carrier for motor cars comprising a vertical bumper rack composed of a number of bars joined by front rear plates with lugs on the latter pivoted on brackets projecting rearwardly from the chassis, an extension rack comprising bars corresponding with the bumper bars and equally spaced and joined by plates hinged to the top of the rear plates of the bumper, and means for connecting the racks in vertical and horizontal positions.

6. A combined rear bumper and carrier for motor cars as set forth in claim 5, and in which the plates of the extension rack and the front plates of the bumper rack are formed with eyes adapted to be engaged by detachable pins when the device is used only as a bumper and the chassis is provided with lugs formed with eyes for connecting with the eyes of the back plates of the extension rack when the bumper is used also as a carrier.

7. A combined rear bumper and carrier for motor cars as set forth in claim 4 and in which the bars of the bumper and extension rack are of channel section with their concave sides facing each other when the device is used only as a bumper with short pieces of tubes fixed in the channels of some of the bars.

In witness whereof I have signed this specification.

CECIL HAVELOCK HENDERSON.